(12) United States Patent
Sawada

(10) Patent No.: US 7,242,852 B2
(45) Date of Patent: Jul. 10, 2007

(54) RECORDING/REPRODUCING SYSTEM

(75) Inventor: Hideki Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 1147 days.

(21) Appl. No.: 09/837,190

(22) Filed: Apr. 19, 2001

(65) Prior Publication Data
US 2001/0033740 A1 Oct. 25, 2001

(30) Foreign Application Priority Data
Apr. 21, 2000 (JP) ............................ 2000-120495

(51) Int. Cl.
H04N 5/91 (2006.01)
H04N 7/26 (2006.01)
G06K 9/00 (2006.01)
(52) U.S. Cl. .................. 386/111; 348/569; 382/125; 382/232; 382/236; 386/96; 386/111
(58) Field of Classification Search ................ 386/68, 386/69, 70–125, 126, 45
See application file for complete search history.

(56) References Cited

U.S. PATENT DOCUMENTS

| 5,862,402 | A | * | 1/1999 | Sekiya ........................... 710/2 |
| 5,966,495 | A | * | 10/1999 | Takahashi et al. ............. 386/68 |
| 6,163,646 | A | * | 12/2000 | Tanaka et al. ................. 386/96 |
| 6,404,928 | B1 | * | 6/2002 | Shaw et al. .................. 382/232 |
| 6,608,938 | B2 | * | 8/2003 | Honda et al. ................ 382/236 |
| 6,697,566 | B2 | * | 2/2004 | Fujinami et al. ............. 386/111 |
| 6,710,817 | B2 | * | 3/2004 | Oku et al. ................... 348/569 |
| 6,862,402 | B2 | * | 3/2005 | Kim ............................ 386/111 |
| 2004/0240714 | A1 | * | 12/2004 | Acharya et al. ............. 382/125 |
| 2004/0240744 | A1 | * | 12/2004 | Honda et al. ............... 382/236 |

FOREIGN PATENT DOCUMENTS

| JP | 7-30851 | 1/1995 |
| JP | 08-279273 | 10/1996 |
| JP | 10-136308 | 5/1998 |

OTHER PUBLICATIONS

Japanese Office Action with English translation of pertinent portions dated Feb. 25, 2003.

* cited by examiner

Primary Examiner—Thai Q. Tran
Assistant Examiner—Jamie J Vent
(74) Attorney, Agent, or Firm—Whitham, Curtis, Christofferson & Cook, PC

(57) ABSTRACT

An analog image signal from an input terminal 101 is converted in an ADC 102 to digital data, then stored in a frame memory 103, then subjected to compression processing in a compression processing module 104, and then recorded in a recorder 105. The compressed data recorded in the recorder 105 is read out, then subjected to decompression processing in a decompression processing module 106, and then stored in a frame memory 107. The operation of the compression processing module 104 is controlled by a frame rate controller 110. Thus, the problem of frame data drop-out or reproducing processing delay occurrence when it becomes unable to obtain full frame real time frame capturing, real time compression and real time decompression due to CPU performance insufficiency is solved.

12 Claims, 8 Drawing Sheets (a) INPUT FRAME STRUCTURE (b) COMPRESSION FRAME SEQUENCE (c) DECOMPRESSION FRAME STRUCTURE

FIG.6
(a) INPUT FRAME STRUCTURE
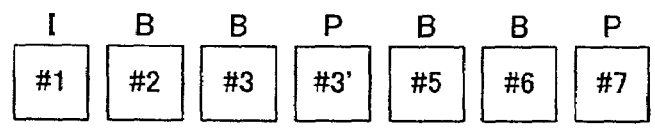
(b) COMPRESSION FRAME SEQUENCE
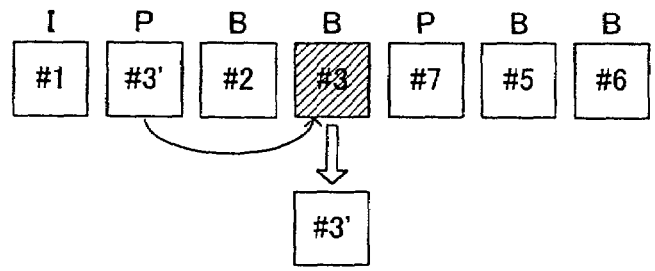
(c) DECOMPRESSION FRAME STRUCTURE
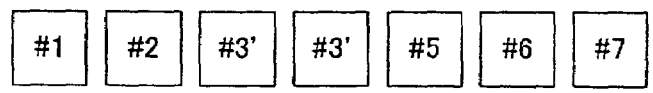

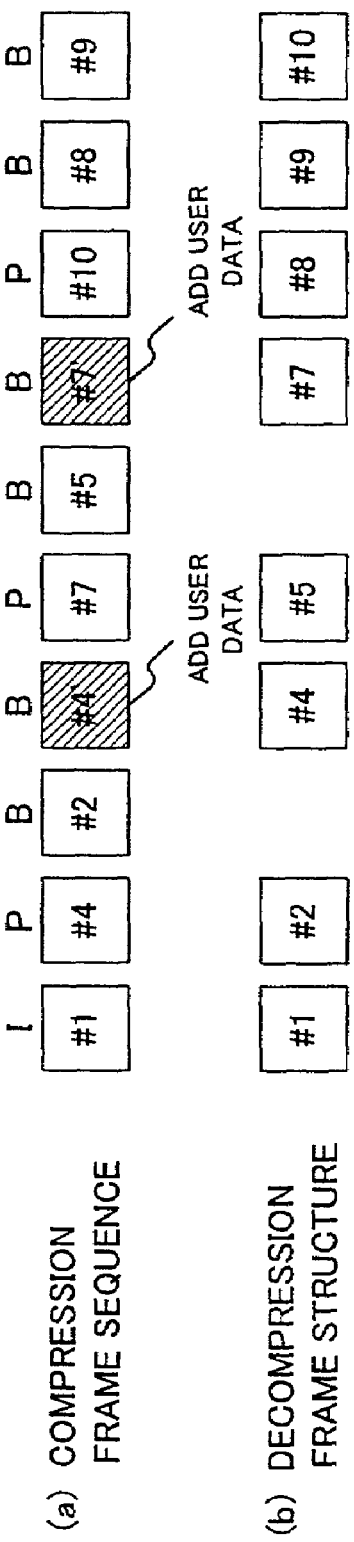

RECORDING/REPRODUCING SYSTEM

BACKGROUND OF THE PRESENT INVENTION

This application claims benefit of Japanese Patent Application No. 2000-120495 filed on Apr. 21, 2000, the contents of which are incorporated by the reference.

The present invention relates to recording/reproducing systems and, more particularly, to real time recording/reproducing systems for recording and real time (instantaneously) reproducing image (or video) data.

Real time recording/reproducing systems have been proposed and practically used, in which television (TV) signals and also signals (image signals) externally inputted from video decks or the like are real time digitally coded and recorded in a recorder, and also in which the recorded digital image signals are decompressed to data covering a given time for time shift reproduction. Such a real time recording/reproducing system is disclosed in, for instance, Japanese Patent Laid-Open No. 7-30851 entitled "Television Broadcast Recording System".

Such a prior art real time recording/reproducing system may, in constitution, make use of personal computer (PC) software processing. In such a case, performance insufficiency of CPU (central processing unit) may arise when the system is operated in parallel with other applications or at the moment of starting the same. In consequence, it becomes impossible to obtain full frame real time capturing, real time compression and real time decompression. This leads to missing of frame data in the compression processing and delay in the reproducing processing and also to a further problem of deviation from synchronism of image and voice to each other.

SUMMARY OF THE INVENTION

An object of the present invention, accordingly, is to provide a real time recording/reproducing system, which can solve the above problems inherent in the prior art.

According to an aspect of the present invention, there is provided a real time recording/reproducing system for converting an analog image signal in an analog-to-digital converter (ADC) to digital data, recording the digital data in a recorder, reading out the digital data recorded in the recorder and converting the read-out digital data in a digital-to-analog converter (DAC) to analog data to be outputted, the real time recording/reproducing system comprising: a first frame memory for storing the output of the ADC; a compression processing module for compressing the output of the first frame memory; a decompression processing module for decompressing the digital data read out from the recorder; a second frame memory for storing the output of the decompression processing module and outputting the stored data to the DAC; and a frame rate controller for controlling the compression processing module.

According to another aspect of the present invention, there is provided a real time recording/reproducing system for converting an analog image signal in an analog-to-digital converter (ADC) to digital data, recording the digital data in a recorder, reading out the digital data recorded in the recorder and converting the read-out digital data in a digital-to-analog converter (DAC) to analog data to be outputted, the real time recording/reproducing system comprising: a first frame memory for storing the output of the ADC; a compression processing module for compressing the output of the first frame memory; a decompression processing module for decompressing the digital data read out from the recorder; a second frame memory for storing the output of the decompression processing module and outputting the stored data to the DAC; and a frame rate controller for controlling the frame rate of the compression processing module to be constant by executing a frame interpolating processing.

According to other aspect of the present invention, there is provided a real time recording/reproducing system for converting an analog image signal in an analog-to-digital converter (ADC) to digital data, recording the digital data in a recorder, reading out the digital data recorded in the recorder and converting the read-out digital data in a digital-to-analog converter (DAC) to analog data to be outputted, the real time recording/reproducing system comprising: a first frame memory for storing the output of the ADC; a compression processing module for compressing the output of the first frame memory; a decompression processing module for decompressing the digital data read out from the recorder and executing a frame skipping processing when it becomes unable to execute full frame real time decompression processing; a second frame memory for storing the output of the decompression processing module and outputting the stored data to the DAC; and a frame rate controller for controlling the compression processing module.

The frame thinning-out in the decompression processing module and the frame skipping in the decompression processing module are performed preferentially from frame-interpolation frames to generate digital compressed data involving much motion. The compression processing modules adds data bit stream data including a picture header representing the start of a frame compression code, a user data representing a thinned-out frame and a reference frame code representing the same frame as a reference frame.

According to further aspect of the present invention, there is provided a real time recording/reproducing system for recording a digital data in a recorder obtained by converting an analog image signal, and reproducing the recorded the digital data through in the analog data format comprising steps of: storing the digital data in a first frame memory; compressing the output of the first frame memory; decompressing the digital data read out from the recorder; storing the decompressed data in a second memory; controlling the frame rate of the compressed data to be constant by executing a frame interpolating processing; and executing a frame skipping processing when it becomes unable to execute full frame real time decompression processing.

The frame thinning-out and the frame skipping operations are performed preferentially from frame-interpolation frames to generate digital compressed data involving much motion. In the compression processing operation data bit stream data including a picture header representing the start of a frame compression code, a user data representing a thinned-out frame and a reference frame code representing the same frame are added as a reference frame.

Other objects and features will be clarified from the following description with reference to attached drawings.

BRIEF DESCRIPTION OF THE DRAWINGS

FIGS. 6(*a*) to 6(*c*) show drawings for explaining frame rate control operation in the real time recording/reproducing system;

FIGS. 9(*a*) and 9(*b*) show a compression frame order and a decompression frame sequence for explaining the real time recording/reproducing system.

PREFERRED EMBODIMENTS OF THE INVENTION

Preferred embodiments of the present invention will now be described with reference to the drawings.

In the real time recording/reproducing system according to the present invention, television signals and also image signals externally inputted from video decks or like systems are real time digitally coded (compressed) and recorded in a recorder, and also the digital compressed data recorded in the recorder are decompressed for time shift reproduction in a given time interval. Where this real time recording/reproducing system is constituted by making use of personal computer (PC) software processing, full frame real time processing may become impossible in the processing of frame capturing at the time of the digital conversion of the input image signal, the processing of compressing the captured frame data and the processing of decompressing the compressed digital data due to performance insufficiency of the central processing unit (CPU). In such a circumstance, the system is adapted to execute a frame interpolation in the frame capturing processing, frame thinning-out in the compression processing and frame skipping in the decompression processing. It is thus made possible to continue real time recording and synchronous reproduction to voice within a limited CPU load. Also, the frame thinning-out in the compression processing and the frame skipping in the decompression processing are performed preferentially from frames that are interpolated in the frame capturing processing. It is thus made possible to obtain generation of digital compressed data involving much motion and also time shift reproduction.

Figure 1:
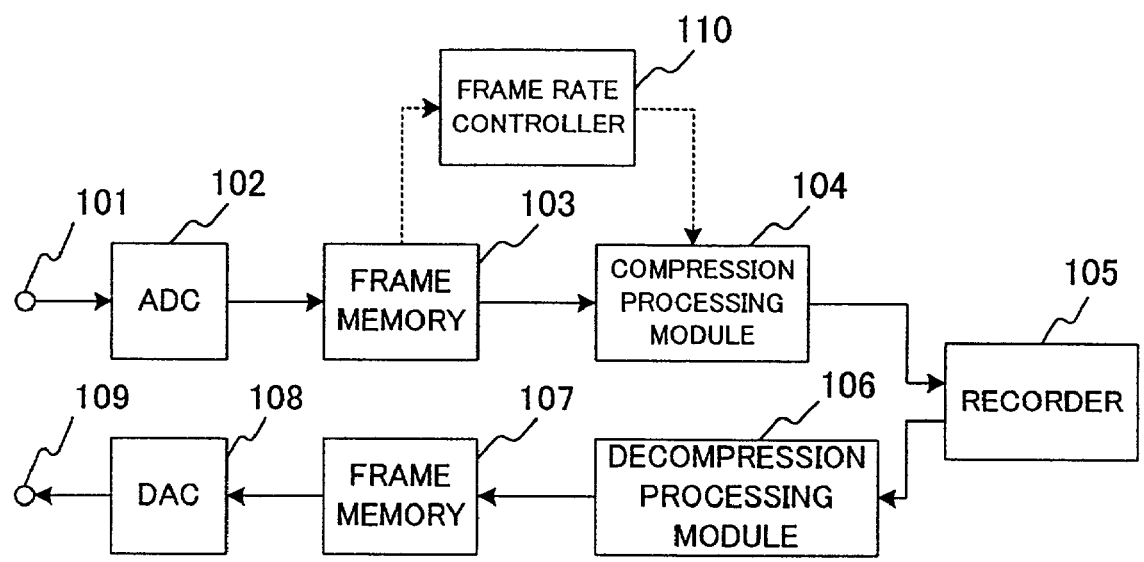
FIG. 1 is a block diagram showing a preferred embodiment of the real time recording/reproducing system according to the present invention.

FIG. 1 is a block diagram showing a preferred embodiment of the real time recording/reproducing system according to the present invention. The system comprises an analog-to-digital converter (ADC) 102 to which an analog image signal is inputted from an image input terminal 101, a frame memory 103, a compression processing module 104, a recorder 105, a decompression processing module 106, a frame memory 107, a digital-to-analog converter (DAC) 108, a reproduced video output terminal 109 and a frame rate controller 110.

In the real time recording/reproducing system shown in FIG. 1, when it becomes impossible due to CPU performance insufficiency to execute a full frame capturing process in the ADC 102, the frame rate controller 110 executes a frame interpolation process such as to provide a constant frame rate of reading data from the frame memory 103 to the compression processing module 104. When the compression processing module 104 becomes unable to execute full frame real time compression processing, it executes a thinning-out process, in which compression processing on some frames is omitted, thus generating digital compressed data at a substantially reduced frame rate while retaining a fixed standard frame rate. When the decompression processing module 106 becomes unable to execute full frame real time decompression processing, it executes a frame skipping process, in which the decompression processing of some frames is skipped, thus effecting reproduction synchronous to voice data. In this way, it is made possible to effect time shift reproduction synchronous to voice data while effecting real time digital compressed data recording even in case when CPU performance insufficiency arises.

The system further has a function of causing inter-frame thinning-out process in the compression processing module 104 and frame skipping process in the decompression processing module 106 preferentially from frame-interpolated frames. It is thus made possible to obtain generation of digital compressed data involving much motion and time shift reproduction.

In the real time recording/reproducing system shown in FIG. 1, the ADC 102 converts analog signal externally inputted to the input terminal 101 to digital form and also executes a capturing process in units of frames. The frame memory 103 stores the captured frame data. The compression processing module 104 compresses the frame data. The recorder 105 records the compressed digital data. The decompression processing module 106 decompresses the compressed digital data. The frame memory 107 stores the decompressed frame data. The DAC 108 converts the digital frame data to analog form. Where the real time recording/reproducing system is constructed by making use of PC software processing, the compression and decompression processing modules 104 and 106 constitute CPU software processing parts. The ADC 102 may be a video capture card. The frame memories 103 and 107 may be, for example, memories such as main memory and video memory. The DAC 108 may be a graphic accelerator card. The recorder 105 may be constituted by a hard disc drive or the like.

The functions of the individual elements in the real time recording/reproducing system shown in FIG. 1 will now be described. The ADC 102 converts analog signal externally inputted from the input terminal 101 to digital form, captures the digital image data thus obtained in units of frames, and feeds out the captured data to the frame memory 103 for storage therein. The compression processing module 104 compresses the frame data stored in the frame memory 103, and feeds out the compressed data to the recorder 105 for recording therein. The decompression processing module 106 decompresses the compressed digital data recorded in the recorder 105 to data covering a given time, and feeds out the decompressed data to the frame memory 107 for storage therein. The DAC 108 converts the digital frame data stored in the frame memory 107 to analog form for outputting the analog data thus obtained from the output terminal 109.

When the system becomes unable to execute full frame real time processing due to the CPU performance insufficiency, the frame rate controller 110 executes a control process of controlling the frame rate of data read out from the frame memory 103 to the compression processing module 104 to be constant. The compression processing module 104 has a frame thinning-out function of thinning out some frames in the compression processing to reduce the actual frame rate while holding a constant standard frame rate with omitting a part of the frame compression process. The decompression processing module 106 has a frame skipping function of skipping some frames in the decompression processing for reproduction synchronous to voice data with omitting a part of the frame decompression process. As for the frame thinning-out process in the compression processing module 104 and the frame skipping function in the decompression processing module 106, further functions are provided that these processes are executed preferentially from frame-interpolated frames.

Figure 2:
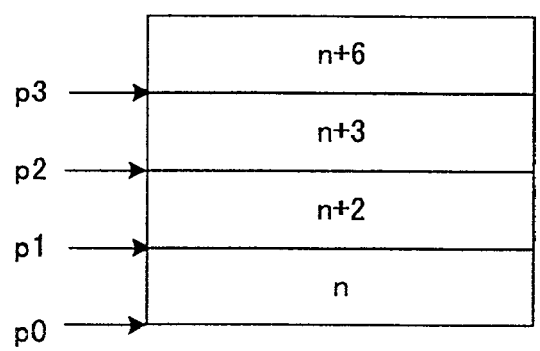
FIG. 2 shows an example of drop-out in the real time recording/reproducing system.

The operation of the real time recording/reproducing system shown in FIG. 1 will now be described in greater detail. Referring to FIG. 1, when the ADC 102 becomes unable to execute full frame real time capturing process due to the CPU performance insufficiency, the frame data stored in the frame memory 103 becomes discontinuous such that some frames are dropped out. FIG. 2 shows an example of such drop-out. In this example, frames (n+1), (n+4) and (n+5) are dropped out. The frame rate controller 110 executes frame drop-out judgment by obtaining time data of each captured frame from the ADC 102. The controller 110 then controls the frame rate of the input to the compression processing module 104 to be constant by executing a frame interpolation process concerning the dropped-out frames. The controller 110 normally designates a pointer of a memory area with each frame data stored therein to the compression processing module 104.

However, in the case of frame drop-out generation as shown in FIG. 2, for the compression with respect to the frame (n+1) the frame rate controller 110 designates pointer p0 of preceding compressed frame (n) once again. Likewise, for the compression with respect to the frames (n+4) and (n+5) the controller 110 designates pointer p2 of the frame (n+3) twice continuously. In this way, the controller 110 controls the frame rate in the compression processing module 104 to be constant. As an alternative to the above continuously pointer designating method, it is possible to adopt the following method. When designating pointer p1 of the frame (n+2), the controller 110 separately informs that one frame has been dropped out. Likewise, when designating pointer p3 of the frame (n+6), the controller 110 separately informs that two frames have been dropped out. The actual frame interpolating process may be executed in the compression processing module 104.

In the real time recording/reproducing system shown in FIG. 1, the compression processing module 104 executes digital compression processing in a compressing system, which conforms to, for instance, MPEG (Motion Picture Experts Group compressing system) standards. When the module 104 becomes unable to execute full frame real time compression processing, it executes frame thinning-out processing for reducing the actual frame rate by thinning out some frames in the compression processing while holding a fixed regular frame rate as prescribed in the MPEG standards. The CPU load in the compression processing is thus reduced so as to be able to continue the real time processing. In the MPEG standards, three different "frame types", i.e., types of frames subjected to the compression processing, are defined, that is, with omitting a part of the frame compression process "I frame" which does not require any reference frame and may serve as a reference frame for other frames, "P frame" which requires a reference frame and may also serve as a reference frame for other frames, and "B frame" which requires a reference frame and does not serve as any reference frame. The frame thinning-out processing is executed with respect to "B frames", which are always non-reference frames among the above three different frame types.

Figure 3:
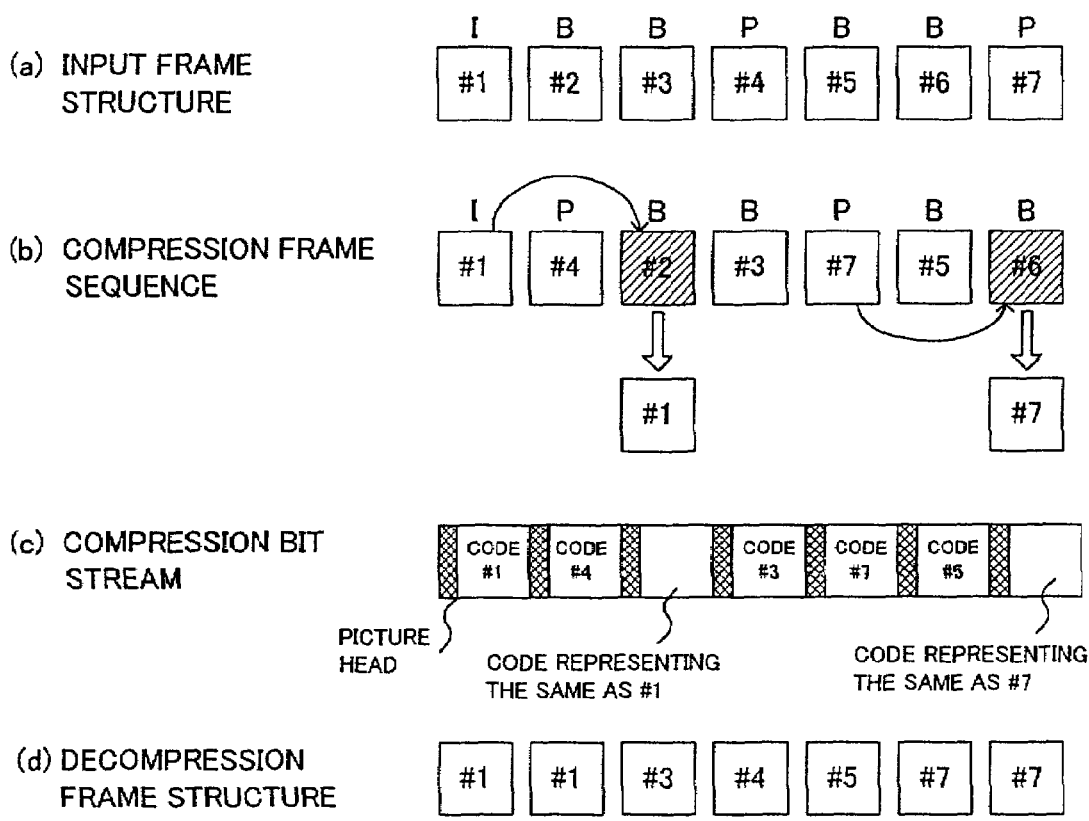
FIGS. 3(a) to 3(d) show the procedure of thinning out input frames in the real time recording/reproducing system.

The procedure of thinning out input frames will now be described with reference to FIGS. 3(a) to 3(c). FIG. 3(a) shows an "input frame sequence". It is shown that I frame #1, B frames #2 and #3, P frame #4, B frames #5 and #6, and P frame #7 are compressed. FIG. 3(b) shows a "frame compression order". The I frame #1 and P frame #7 which have been compressed earlier, are used as reference frames for the B frames #2 and #3. Likewise, the P frames #4 and #7 having been compressed earlier are used as reference frames for the B frames #5 and #6.

FIG. 3(c) shows a "compression bit stream" when thinning out the frames #2 and #6. For the frames #1, #4, #3, #7 and #5, a picture header 81 representing the start of a frame compression code is added to the bit stream. The data subsequent to the picture header is then coded, and the coded data is added to the bit stream. The frames #2 and #6 are processed likewise until the addition of the picture header 81 representing the start of frame compression code to the bit stream. In these frames, however, the data subsequent to the picture header 81 are not coded. Instead, code 83 representing the same frame as reference frame is added to the bit stream. The same frame as reference frame is constituted by an adjacent reference frame in the input frame sequence. That is, in the frame #2 the added code 83 represents that this frame is the same as the immediately preceding frame #1, and in the frame #6 it represents that this frame is the same as the immediately succeeding frame #7. These rules are absolute rules. This frame is the same as the immediately preceding frame, and as the immediately succeeding frame. Thus, the codes may be stored in a main memory or the like, so that only codes read out from the memory may be added without any coding processing. FIG. 3(d) shows a "frame decompression order", in which the compression bit stream is decompressed. It is shown that the actual frame rate is reduced while holding the total input frame rate, i.e., the MPEG standard frame rate, to be constant.

Figure 4:
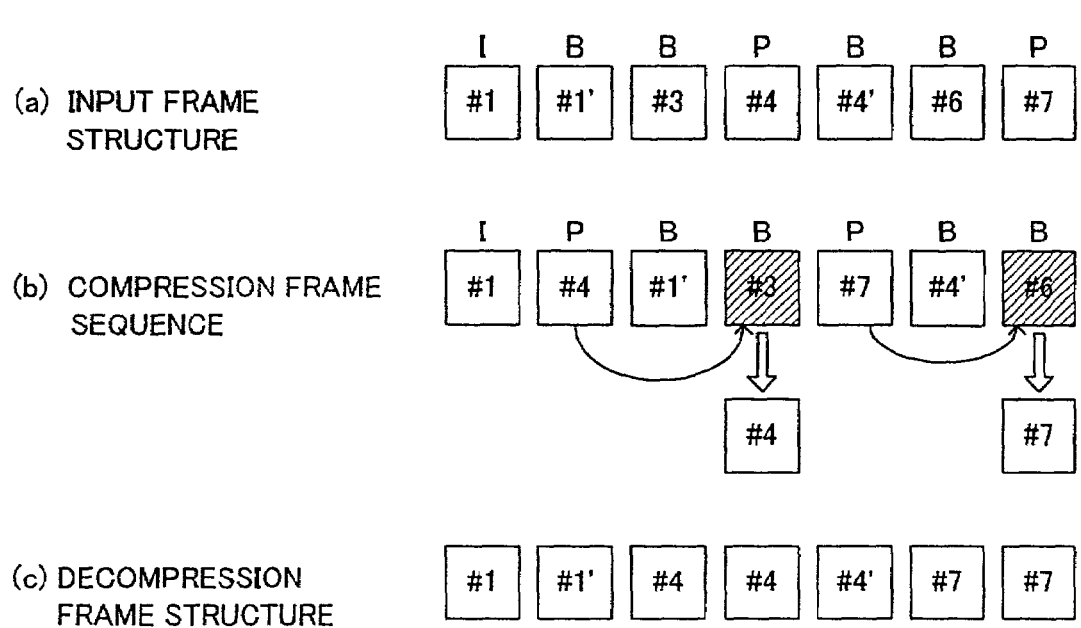
FIGS. 4(*a*), 4(*b*) and 4(*c*) show drawings for explaining frame interpolation operation in the real time recording/reproducing system.

The case of execution of the frame interpolating processing in the frame rate controller 110 and the frame thinning-out processing in the compression processing module 104 independently of each other, will now be described with reference to FIGS. 4(a) to 4(c). FIG. 4(a) shows an input frame sequence in the case when the frames #2 and #5 are thinned out by the frame rate controller 110. FIG. 4(b) shows a compression frame order, which is obtained with the input of the frames #3 and #6 as interpolated frames, obtained as a result of interpolation with the frames #1 and #4 (shown as frames #1' and #4'), respectively, to the compression processing module 104, are thinned out in the frame thinning-out processing therein. FIG. 4(c) shows a decompression frame sequence obtained by subsequent compression bit stream decompression. In this case, only three frames, i.e., the frames #1, #4 and #7, involve motion.

Figure 5:
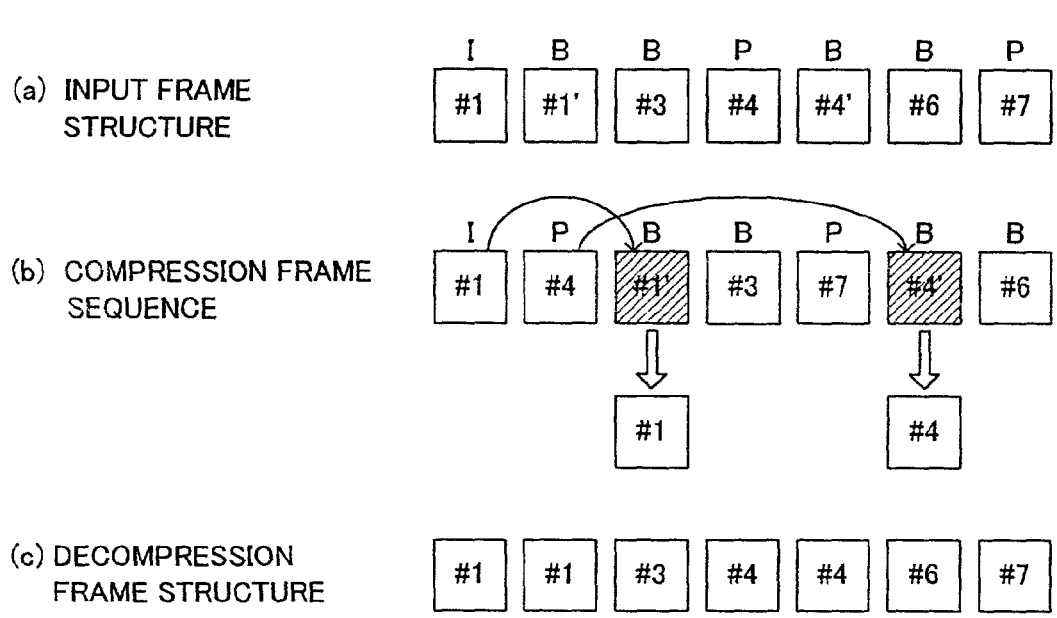
FIGS. 5(*a*), 5(*b*) and 5(*c*) show drawings for explaining frame rate control operation in the real time recording/reproducing system.

FIG. 5(a) shows an input frame sequence in the case of frame thinning-out in the compression processing module 104. The frame rate controller 110 checks whether frame interpolating processing has been performed. FIG. 5(b) shows a compression frame order obtained as a result of frame thinning-out preferentially from frames obtained by interpolation in the frame rate controller 110. FIG. 5(c) shows a decompression frame sequence obtained as a result of compression bit stream decompression when the same two frames are interpolated. In this case, the frames involving motion are increased to five frames, i.e., the frames #1, #3, #4, #6 and #7. When the frame rate controller 110 decides that a compression frame obtained by frame interpolation is a reference frame, the compression processing module 104 becomes unable to execute any frame thinning-out processing.

In such a case, the frame thinning-out is performed by substituting the immediately preceding B frame in the input frame sequence for the subject of it. FIGS. 6(a) to 6(c) show the input frame sequence, the compression frame order and the decompression frame sequence, respectively, in this case. As shown, the subject of the frame interpolation does not concern the frame #3' obtained by the frame interpolation but the immediately preceding B frame #3.

Referring to FIG. 1, the decompression processing module 106 executes digital decompression processing in a decompressing system, which conforms to the MPEG standards, for instance. The module 106 reads out the compression bit stream data recorded in the recorder 105 for decompression processing in a given time. The decompressed frame data is accumulated in the frame memory 107. The frame data accumulated in the frame memory 107 is converted in the DAC 108 to analog form, and then outputted via the output terminal 109 to an external display terminal for display therein. When the decompression processing module 106 becomes unable to execute full frame real time decompression processing, a check is performed as to the delay with respect to voice. When a status involving a delay takes place, frame skipping control of omitting the compression bit stream decompressing processing is performed. The control is performed such as to continue reproduction synchronous to voice. A basic control method for the frame skipping control has been proposed by the same inventor and applicant as in this application, and is disclosed in Japanese Patent Laid-Open No. 10-136308 entitled "Synchronous Audio/Video Reproducing System", and its detailed description is not given here.

Figure 7:
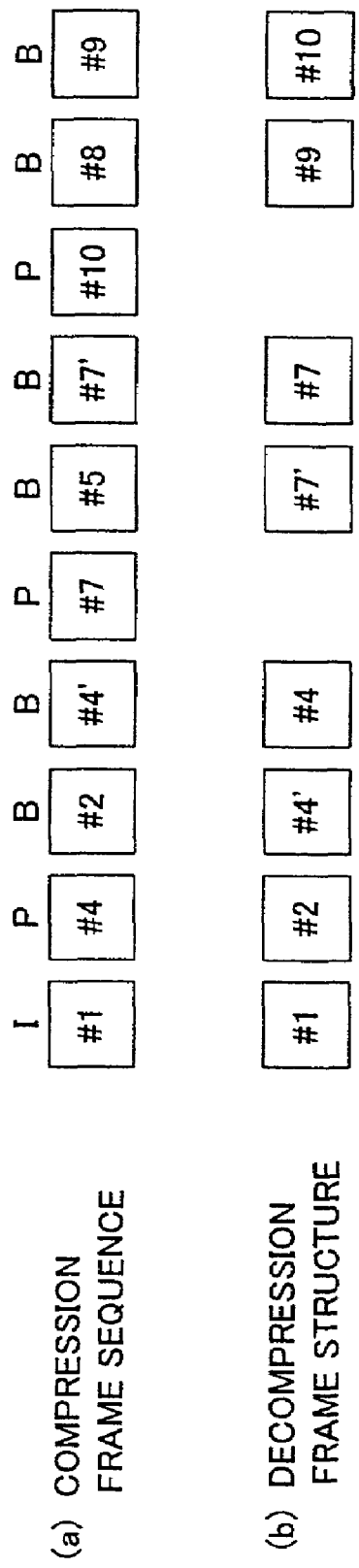
FIGS. 7(*a*) and 7(*b*) show drawings for explaining the frame skipping operation in the decompression processing in the real time recording/reproducing system.
Figure 8:
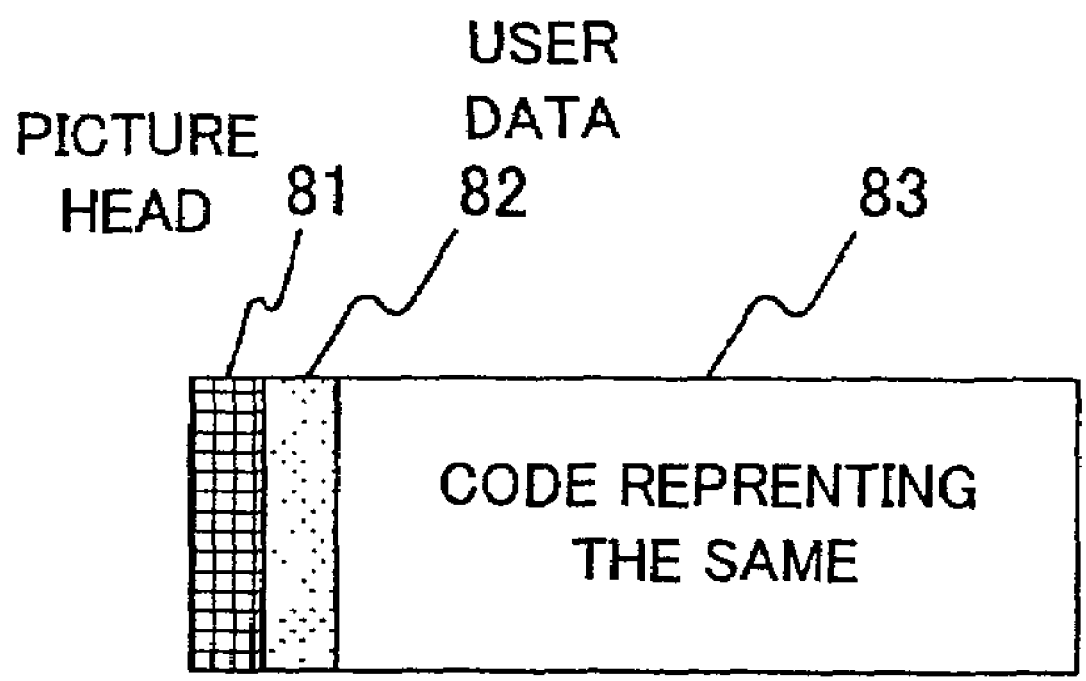
FIG. 8 shows the structure of bit stream data in the real time recording/reproducing system.

The case of execution of the frame thinning-out processing in the compression processing module 104 and the frame skipping processing in the decompression processing module 106 independently of each other, will now be described with reference to FIGS. 7(a) to FIG. 9. FIG. 7(a) shows a compression frame order, which is adopted in the thinning-out of the frames #3 and #6 in the compression processing module 104. FIG. 7(b) shows a decompression frame sequence obtained as a result of the skipping of two frames, i.e., the frames #5 and #8. In this case, only six frames, i.e., the frames #1, #2, #4, ##7, #9 and #10, involve motion. Accordingly, the compression processing module 104 adds bit stream data as shown in FIG. 8. Specifically, when executing the frame thinning-out, the module 104 inserts user data 82, clearly representing that the pertinent frame has been thinned out, between the picture header 81 and the code 83 representing that the frame is the same frame as the reference frame. Thus, when reproducing the bit stream data recorded in the recorder 105, the decompression processing module 106 can clearly determine that the pertinent frame has been thinned out.

When the decompression processing module 106 decompresses compression bit stream data read out from the recorder 105, it checks whether the user data 81 representing that the pertinent frame has been thinned out is present right after the picture header 82 representing the start of frame compression code. Then the module 106 finds that the pertinent frame has been thinned out, and frame skipping control is performed with preferential omitting of the decompression processing. FIG. 9(a) shows a compression frame order in such a case. Here, the frames #4' and #7' have been thinned out in the decompression processing module 104. For these frames, the user data 82 representing that the pertinent frame has been thinned out, is added subsequent to the picture data 81. FIG. 9(b) shows a decompression frame sequence. The module 106 checks whether the user data 82 is present right after the picture data 81, and executes frame skipping processing preferentially from the frames, which the user data 82 is added for. Thus, when the same two frames are skipped, the frames involving motion are increased to eight frames, i.e., the frames #1, #2, #4, #5 and #7 to #10.

As has been described in the foregoing, the real time recording/reproducing system according to the present invention has the following practically pronounced effects. Firstly, the system can continually execute real time image recording processing even when it becomes unable to execute full frame real time recording processing due to CPU performance insufficiency, which may arise when the system is operated in parallel with other applications or at the moment of starting the same. This is so because the system comprises the frame rate controller, which can hold a constant intrinsic frame rate at all times by executing the frame interpolating processing in the event when the system becomes unable to execute full frame real time frame capturing, and also the compression processing module, which has a frame thinning-out function of reducing the actual frame rate while holding the constant intrinsic frame rate.

Secondly, even when the system becomes unable to execute full frame real time reproducing processing due to CPU performance insufficiency, it can perform time shift reproduction in a given time while holding synchronism with voice. This is so because the system comprises the decompression processing module, which has the function of thinning out frames for continuing reproduction synchronous to voice.

Thirdly, the system can record and reproduce compressed data involving much motion even when it becomes unable to execute full frame real time reproducing processing due to CPU performance insufficiency. This is so because of the fact that the compression processing module has the function of executing frame thinning-out processing preferentially from frames obtained by frame interpolation and also that the decompression processing module has the function of executing frame skipping processing preferentially from thinned-out frames.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A real time recording/reproducing system for converting an analog image signal in an analog-to-digital converter (ADC) to digital data, recording the digital data in a recorder, reading out the digital data recorded in the recorder and converting the read-out digital data in a digital-to-analog converter (DAC) to analog data to be outputted, the real time recording/reproducing system comprising:

a first frame memory for storing the output of the ADC;

a compression processing module for compressing the output of the first frame memory;

a decompression processing module for decompressing the digital data read out from the recorder;

a second frame memory for storing the output of the decompression processing module and outputting the stored data to the DAC; and a frame rate controller for controlling the compression processing module to hold a constant intrinsic frame rate by executing frame interpolating processing.

2. The real time recording/reproducing system according to claim 1, wherein the frame thinning-out in the decompression processing module and the frame skipping in the decompression processing module are performed preferentially from frame-interpolation frames to generate digital compressed data involving much motion.

3. The real time recording/reproducing system according to claim 1, wherein the compression processing module adds data bit stream data including a picture header representing a start of a frame compression code, a user data representing a thinned-out frame and a reference frame code representing the same frame as a reference frame.

4. The real time recording/reproducing system according to claim 1, wherein the compression processing module and the decompression processing modules are constituted by central processing unit (CPU) software processing parts.

5. The real time recording/reproducing system according to claim 4, wherein the ADC is a video capture card and the DAC is a graphic accelerator card.

6. The real time recording/reproducing system according to claim 5, wherein the first and second frame memories are main memory and video memory, respectively.

7. The real time recording/reproducing system according to claim 6, wherein the recorder is constitiuted by a hard disc drive.

8. A real time recording/reproducing system for converting an analog image signal in an analog-to-digital converter (ADC) to digital data, recording the digital data in a recorder, reading out the digital data recorded in the recorder and converting the read-out digital data in a digital-to-analog converter (DAC) to analog data to be outputted, the real time recording/reproducing system comprising:

a first frame memory for storing the output of the ADC;

a compression processing module for compressing the output of the first frame memory;

a decompression processing module for decompressing the digital data read out from the recorder;

a second frame memory for storing the output of the decompression processing module and outputting the stored data to the DAC; and a frame rate controller for controlling the frame rate of the compression processing module to be constant by executing a frame interpolating processing, and wherein the compression processing module has a frame thinning-out function of reducing an actual frame rate while holding a constant intrinsic frame rate.

9. A real time recording/reproducing system for converting an analog image signal in an analog-to-digital converter (ADC) to digital data, recording the digital data in a recorder, reading out the digital data recorded in the recorder and converting the read-out digital data in a digital-to-analog converter (DAC) to analog data to be outputted, the real time recording/reproducing system comprising:

a first frame memory for storing the output of the ADC;

a compression processing module for compressing the output of the first frame memory;

a decompression processing module for decompressing the digital data read out from the recorder and executing a frame skipping processing when it becomes unable to execute full frame real time decompression processing;

a second frame memory for storing the output of the decompression processing module and outputting the stored data to the DAC; and a frame rate controller for controlling the compression processing module to be constant by executing frame interpolating processing, wherein the decompression processing module has a function of thinning out frames for continuing reproduction synchronous to voice.

10. A real time recording/reproducing method for recording a digital data in a recorder obtained by converting an analog image signal, and reproducing recorded digital data in an analog data format comprising steps of:

storing the digital data in a first frame memory;

compressing the output of the first frame memory;

recording a compressed output of the first frame memory as digital data in the recorder;

decompressing the digital data read out from the recorder;

storing the decompressed data in a second memory;

controlling the frame rate of the compressed output of the first frame memory to be constant by executing a frame interpolating processing; and executing a frame skipping processing when full frame real time decompression processing cannot be executed.

11. The real time recording/reproducing system according to claim 10, wherein the frame thinning-out and the frame skipping operations are performed preferentially from frame-interpolation frames to generate digital compressed data involving much motion.

12. The real time recording/reproducing system according to claim 10, wherein in the compression processing operation data bit stream data including a picture header representing the start of a frame compression code, a user data representing a thinned-out frame and a reference frame code representing the same frame are added as a reference frame.

* * * * *